US012792044B2

(12) United States Patent
Rideau et al.

(10) Patent No.: US 12,792,044 B2
(45) Date of Patent: Nov. 10, 2026

(54) SYSTEM FOR DEPARTURE CLEARANCE OF A VEHICLE

(71) Applicant: Torc Robotics, Inc., Blacksburg, VA (US)

(72) Inventors: Dain Anthony Rideau, Wheaton, IL (US); Justin Brown, Lynchburg, VA (US); Colin Burn, Norfolk, CT (US)

(73) Assignee: Torc Robotics, Inc., Blacksburg, VA (US)

( * ) Notice: Subject to any disclaimer, the term of this patent is extended or adjusted under 35 U.S.C. 154(b) by 132 days.

(21) Appl. No.: 18/799,542

(22) Filed: Aug. 9, 2024

(65) Prior Publication Data

US 2026/0044146 A1 Feb. 12, 2026

(51) Int. Cl.

*B60W 60/00* (2020.01)
*G05D 1/224* (2024.01)
*G07C 5/00* (2006.01)

(52) U.S. Cl.

CPC ....... *G05D 1/2244* (2024.01); *B60W 60/0025* (2020.02); *G07C 5/008* (2013.01)

(58) Field of Classification Search

CPC ............ G05D 1/2244; B60W 60/0025; B60W 60/00182; G07C 5/008

See application file for complete search history.

(56) References Cited

U.S. PATENT DOCUMENTS 7,685,872 B2 3/2010 David
9,156,483 B2 10/2015 Cooper et al.
9,371,133 B2 6/2016 Mays
10,126,136 B2 * 11/2018 Iagnemma ............. G01C 21/34
11,055,803 B2 7/2021 Arakawa et al.
11,536,855 B2 * 12/2022 Bennington ...... B60W 60/0027
11,854,319 B2 12/2023 Patnaik
2012/0246039 A1 9/2012 Fain et al.
2014/0046585 A1 * 2/2014 Morris, IV ........... G06Q 10/047 701/400
2014/0142785 A1 * 5/2014 Fuentes ................ G05D 1/0027 701/2
2016/0253908 A1 * 9/2016 Chambers ............ G05D 1/1064 701/2
2017/0200305 A1 * 7/2017 Oddo ..................... G06F 16/256
2019/0066398 A1 2/2019 Sankavaram et al.
2019/0129420 A1 * 5/2019 Yoshizaki ............. B60W 30/10

(Continued)

*Primary Examiner* — Manglesh M Patel

(74) *Attorney, Agent, or Firm* — McCarter & English, LLP

(57) ABSTRACT

A system for departure clearance of a vehicle is provided. The system includes a vehicle including a processing device and operational systems for operating the vehicle, and a mission control system in communication with the processing device of the vehicle. The system performs operations including transmitting mission parameters from the mission control system to the vehicle, and querying and receiving data at the processing device of the vehicle relating to road conditions and weather conditions along the intended route. The operations include autonomously determining whether the mission parameters can be met based on the received data relating to the road conditions and the weather conditions. The operations include transmitting to the mission control system a “go” indicator if the mission parameters can be met, or transmitting to the mission control system a “no go” indicator if the mission parameters cannot be met.

20 Claims, 9 Drawing Sheets

(56) References Cited

U.S. PATENT DOCUMENTS

| | | | | |
|---|---|---|---|---|
| 2020/0191951 | A1 | 6/2020 | Reilly et al. | |
| 2020/0192403 | A1* | 6/2020 | Silver | G01S 13/862 |
| 2022/0018972 | A1* | 1/2022 | Bennington | G05D 1/101 |
| 2022/0324525 | A1 | 10/2022 | Vikström et al. | |
| 2023/0001948 | A1 | 1/2023 | Hayashi et al. | |
| 2023/0139933 | A1* | 5/2023 | Tam | B60W 60/0053 701/26 |
| 2023/0153745 | A1 | 5/2023 | Patnaik et al. | |
| 2023/0384797 | A1 | 11/2023 | White, III | |
| 2024/0013584 | A1 | 1/2024 | Maitre et al. | |
| 2026/0105847 | A1* | 4/2026 | Selvarajan | G08G 5/21 |

* cited by examiner

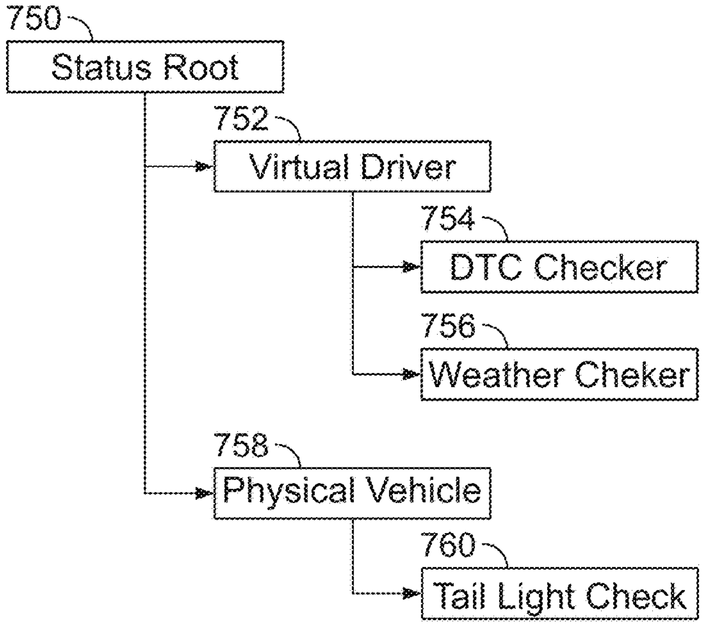

FIG. 9

```
vehicle_status:
  virtual_driver:
    name: "Virtual Driver"
    dtc:
      uuid: 038f74d2-c3bd-4c70-9fd5-1664fe12ae4e
      name: "DTC Checker"
      manual: false
    weather:
      uuid: 1 c3a597e-a205-44b5-8aae-9fde5d8550cb
      name: "Weather Checker"
      manual: false
  physical_vehicle:
      uuid: 038f74d2-c3bd-4c70-9fd5-1664fe12ae4e
      name: "Tail Light Check"
      manual: true
```

FIG. 10

| device | mission | status_uuid | timestamp | status |
|---|---|---|---|---|
| c18 | 04cbd225-7dce-4c4b-8f10-2047770f6c8e | 038f74d2-c3bd-4c70-9fd5-1664fe12ae4e | 1643814657 | green |
| c18 | 04cbd225-7dce-4c4b-8f10-2047770f6c8e | 1 c3a597e-a205-44b5-8aae-9fde5d8550cb | 1643814657 | red |
| c18 | 04cbd225-7dce-4c4b-8f10-2047770f6c8e | a44297b4-6094-442e-b9f0-271d34a01de5 | 1643814657 | green |

FIG. 11

SYSTEM FOR DEPARTURE CLEARANCE OF A VEHICLE

TECHNICAL FIELD

The field of the disclosure relates to departure clearance of a vehicle and, in particular, to a system for determining and permitting departure clearance of an autonomous vehicle based on various mission parameters.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Conventionally, launching an autonomous vehicle involves performing a physical check of the vehicle and its systems to ensure that the vehicle is approved to proceed with the mission. After the physical checks have been performed and approved/passed, mission control transmits to the autonomous vehicle certain mission parameters, such as the start location of the vehicle, the end location of the vehicle, and the intended route to reach the end location. Once the route is validated, the vehicle is permitted to depart the start location to proceed along the intended route. However, certain factors associated with the health of the vehicle may not be easily perceived in conventional health checks and may affect the operation of the vehicle during the mission. In some instances, occurrences along the mission route may create obstacles to completing the mission and are not factored in before departure during conventional departure checks.

Accordingly, there exists a need for a system and a method of departure clearance for an autonomous vehicle to ensure the mission parameters can be met before the vehicle is permitted to depart the start location. These and other needs are met by the exemplary system for departure clearance discussed herein.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an exemplary system for departure clearance of a vehicle is provided. The system includes a vehicle including a processing device and operational systems for operating the vehicle. The system includes a mission control system in communication with the processing device of the vehicle. The mission control system includes a user interface configured to receive and transmit data. The processing device of the vehicle and/or a processing device of the mission control system are configured to execute instructions stored in a memory to perform operations for departure clearance of the vehicle. The operations include transmitting mission parameters from the mission control system to the vehicle. The mission parameters include at least a starting location of the vehicle, an end location of the vehicle, and an intended route to be taken by the vehicle from the starting location to the end location. The operations include querying and receiving data at the processing device of the vehicle relating to road conditions and weather conditions along the intended route. The operations include autonomously determining whether the mission parameters can be met based on the received data relating to the road conditions and the weather conditions. The operations include transmitting to the mission control system a “go” indicator if the mission parameters can be met, or transmitting to the mission control system a “no go” indicator if the mission parameters cannot be met.

The operational systems can include at least one of sensors for providing visibility around the vehicle, a fuel tank sensor, tire pressure sensors, or a trailer connection sensor. The mission parameters can include at least one of a departure day, a departure time, an arrival day, an arrival time, a mission route, a mission identifier, a transaction identifier, weather conditions, or road conditions. The operations can include autonomously checking a health status of the operational systems with the processing device of the vehicle, and transmitting results of the health status to the mission control system.

The operations can include receiving as input via the user interface at the mission control system a health status confirmation for at least some of the operational systems based on a manual check of the at least some of the operational systems. If a conflict occurs between results of the health status performed autonomously and the health status confirmation performed by the manual check based on an unhealthy status identified by the autonomously performed health status and a health status identified by the manual check, the autonomously performed health status governs decision making by the processing device and the mission control system. In some embodiments, as a safety, the manual health status check can override an autonomous health status check when a conflict occurs; in contrast, an autonomous health status check cannot be used by the system to override a manual health status check. In some embodiments, as a safety, any unhealthy status—whether determined through the manual or autonomous review—overrides departure clearance and necessitates correction before departure clearance can be considered.

If a “no go” indicator is transmitted to the mission control system, the operations can include generating new mission parameters that adjust the mission parameters based on the data relating to the road conditions and the weather conditions. If the “go” indicator is transmitted to the mission control system, the health status of the operational systems autonomously checked by the processing device of the vehicle is confirmed, and the health status confirmation based on the manual check is confirmed, the operations include transmitting an approval request from a mission manager via the user interface of the mission control system.

The operations can include receiving the approval request from the mission manager via the user interface, and transmitting a final departure approval request from a hub operator for launch of the vehicle from a departure pad. The operations can include receiving the final departure approval request from the hub operator via the user interface of the mission control system. The operations can include autonomously determining whether the mission parameters can be met based on operational design domain (ODD) guidelines. The ODD guidelines can include limitations on environmental conditions in which autonomous operation of the vehicle can be performed.

In another aspect, an exemplary computer-implemented method for departure clearance of a vehicle is provided. The method includes establishing a communication between a processing device of a vehicle having operational systems for operating the vehicle and a mission control system. The communication can be established by, e.g., transmission over cellular connectivity, secured using TLS, authenticated using an identity certificate, combinations thereof, or the like. The mission control system includes a user interface configured to receive and transmit data. The method includes transmitting mission parameters from the mission control system to the vehicle. The mission parameters include at least a starting location of the vehicle, an end location of the vehicle, and an intended route to be taken by the vehicle from the starting location to the end location. The method includes querying and receiving data at the processing device of the vehicle relating to road conditions and weather conditions along the intended route. The method includes autonomously determining whether the mission parameters can be met based on the received data relating to the road conditions and the weather conditions. The method includes transmitting to the mission control system a "go" indicator if the mission parameters can be met, or transmitting to the mission control system a "no go" indicator if the mission parameters cannot be met.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 9 is a flow chart of mission parameter checks performed by an exemplary system for departure clearance of a vehicle.

FIG. 10 is an example of source code for the mission parameter checks of FIG. 9.

FIG. 11 is an example table of data storage for the mission parameter checks of FIG. 9.

Figure 1:
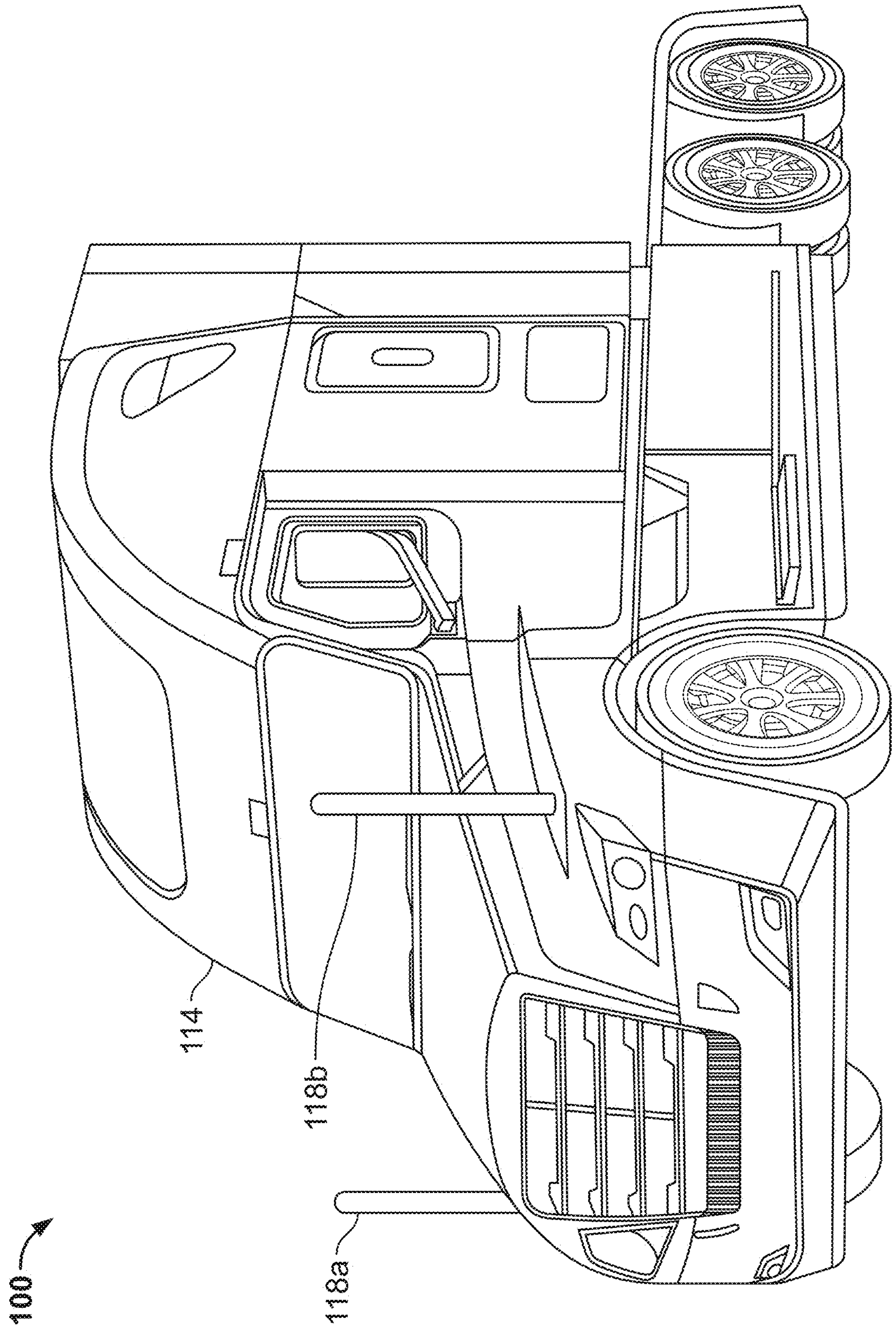
FIG. 1 is a schematic view of an autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

With respect to autonomous or semi-autonomous vehicles, not having a driver can present unique challenges to launching the vehicle into a mission. The system discussed herein ensures a safe and successful autonomous launch by creating a series of pre-departure checks to be completed manually and by automated systems prior to mission start. These checks ensure that the mission parameters can be met before releasing the vehicle for departure. If the mission parameters cannot be met, departure of the vehicle is not permitted. If the mission parameters can be modified to ensure mission success, such modifications can be performed prior to vehicle departure and subsequently departure clearance can be given to the vehicle through the system.

When a vehicle is powered on and staged in a set location compatible with departure clearance, pre-departure checks must occur. Some of the initial steps for pre-departure can be performed by humans (e.g., human-powered), and can involve physical inspection of the vehicle. For example, Department of Transportation (DOT) mandated inspections can be performed by a human and can include reviewing the status of, e.g., light operation, tire pressure, latch closure, sensor operation and positioning, fuel levels, or the like. Some of the pre-departure checks can be based on operational design domain (ODD) standards that indicate under which conditions the autonomous vehicle can operate, e.g., based on traffic conditions, weather conditions, industry constraints, or the like.

Some of the pre-departure checks are performed automatically and autonomously within the autonomous vehicle (e.g., vehicle health checks). Such autonomous health checks can include, e.g., sensor operation, vehicle intent (which includes aggregate signals from systems on the vehicle, such as perception, localization, mapping, or the like), detected and gathered information on outside world/environment, understood mission path, actions of vehicle and other objects/vehicle around autonomous vehicle, whether starting location is acceptable to start mission, pathway clearance relative to obstacles, fuel levels, tire pressure, state of cargo door, brake operation of trailer, calibration of sensors, weather conditions along mission route, traffic conditions along mission route, road conditions and/or closures along mission route, combinations thereof, or the like.

If any automated vehicle health checks fail and are in conflict with the manual health checks performed by a human, the automated vehicle health checks override the manual health checks and the vehicle is not cleared for departure until the failed health issues are addressed and pass a subsequent autonomous and manual health check. In some embodiments, as a safety, any unhealthy status—whether determined through the manual or autonomous review—overrides departure clearance and necessitates correction before departure clearance can be considered. The autonomous health checks are performed based on thresholds programmed into the system. For example, a threshold tire pressure can be programmed into the system such that any value below the threshold value would result in a failed health status. However, if the detected tire pressure is equal to or above the threshold value (or within a threshold range), the health status for tire pressure passes. If the tire pressure drops to below the threshold value during the mission, sensors can detect the pressure drop and can address as needed to correct the issue along the route, e.g., a signal can be transmitted to mission control for maintenance to address the low tire pressure. If the tire pressure falls below a minimum value during the mission and results in a safety issue, the vehicle can be guided to a safe location/hub to correct the tire pressure.

If a failure signal is received for any health checks and/or parameter checks, the system can determine the appropriate action based on the type of issue involved and the severity of the issue. For example, if weather conditions are not optimal or unsafe for autonomous vehicle operation and there are no alternative routes that could be taken by the vehicle, the system can determine that waiting for weather conditions to clear is recommended. As a further example, if a minor failure of a system component occurs, such component can be repaired at a hub before running the autonomous health check again. As a further example, if a major failure of a system component occurs, the system can stop the entire process and prevent deployment of the vehicle. In addition to reviewing current weather and/or road conditions, the system can review future/expected weather and/or road conditions and use such future predictions to determine how the departure clearance should proceed.

Once the pre-departure checks are complete, a final exchange can occur between a remote, cloud-based system and the autonomous vehicle that conveys the route and time information in exchange for an automated and informed accept/reject response. In some embodiments, the weather and/or road conditions can be transmitted to the autonomous vehicle first (and/or the mission control system can review the weather and/or road conditions) before performing health checks to determine whether the vehicle can even travel along the intended route to its destination. If the weather and/or road conditions prevent the vehicle from traveling to its final destination, the system can hold the mission until the weather and/or road conditions clear. If alternative routes exist and are acceptable, the system can continue with the pre-departure health checks.

The system therefore provides the mission parameters to the autonomous vehicle earlier than conventional systems such that the vehicle (e.g., the processing device of the vehicle) can determine whether the mission parameters can be met early in the process. The system can therefore determine if the mission can be completed based on, e.g., weather conditions, road conditions, combinations thereof, or the like, before performing health checks. This results in a more efficient process of determining departure clearance for the vehicle.

Once all inspections have been completed, the system can send the vehicle to a departure pad. A mission manager can review all forms on the system using the user interface (e.g., a graphical user interface), but does not have launch authorization. If a failure state is indicated in the health checks, appropriate action is taken to correct the health check issue. Once the mission manager reviews and approves of all health checks, the system can transmit an approval indicator to a hub operator on the departure pad. The hub operator can have a line of sight of the vehicle (e.g., whether in person or remotely), and inputs the final authorization for departure clearance of the vehicle through the user interface.

A central hub with a user interface (e.g., mission control) can be used to collect the information/data from the manual health checks and the autonomous health checks. In some embodiments, the inspection of the autonomous vehicle is enhanced and allows for a more direct passage along the mission route without stopping at weight inspection stations. The health checks can be performed on both the truck and the trailer as a pair. If weight thresholds are met during the pre-departure checks for both the truck and the trailer, the system can allow for the vehicle to bypass the weight inspection stations along its route. This provides for a more efficient process of reaching the intended destination.

Various embodiments in the present disclosure are described with reference to FIGS. 1-11 below.

FIG. 1 illustrates a vehicle 100, such as a truck that may be conventionally connected to a single or tandem trailer to transport the trailer (not shown) to a desired location. The vehicle 100 includes a cabin 114 that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin 114.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors. For example, the vehicle 100 can include one or more antenna 118*a*, 118*b* at or near the front of the vehicle 100 with sensors having a field-of-view at the front and/or sides of the vehicle 100.

Similar sensors can be used around the perimeter of the vehicle 100 to ensure full environmental coverage around the vehicle 100 is provided by the sensors. In some embodiments, the vehicle 100 can include, e.g., 5-6 LIDAR sensors, 8-10 cameras, combinations thereof, or the like. In some embodiments, the vehicle 100 can tow a trailer and the trailer can similarly include LIDAR sensors and/or cameras to provide field-of-view coverage around the perimeter of the vehicle 100 and the trailer. The environmental coverage by the sensors and/or cameras therefore provides data corresponding with the front, rear, sides and corners of the vehicle 100 and the trailer hauled by the vehicle 100.

Figure 2:
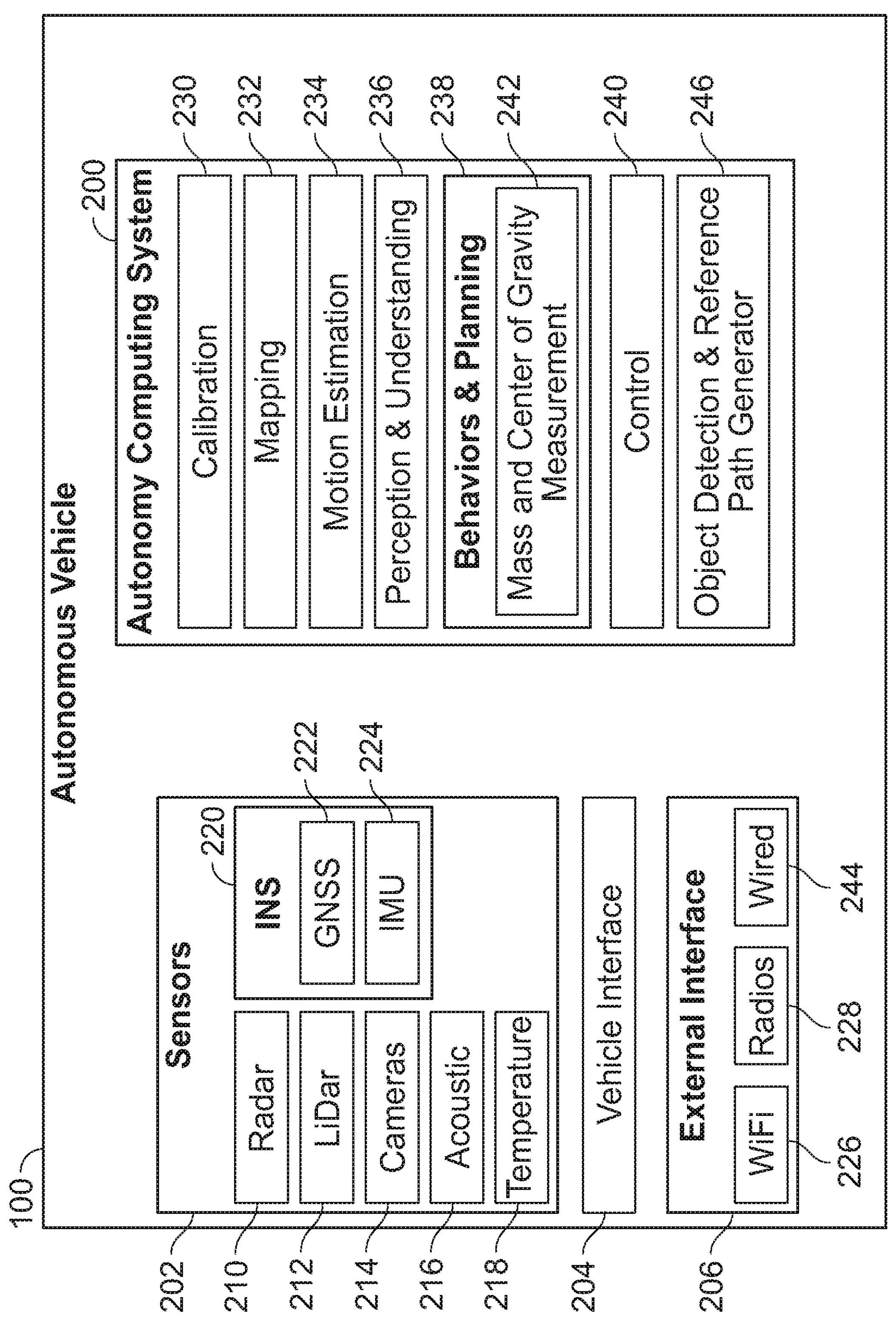
FIG. 2 is a block diagram of the autonomous vehicle shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

In some embodiments, the image data generated by cameras 214 may be transmitted to mission control for one or more of identifying one or more construction markers (or nodes), generating one or more connectivity graphs based upon identified construction markers (or nodes), updating a reference path based upon the one or more connectivity graphs, transmitting the updated reference path to the autonomy vehicle 100 for guiding autonomous vehicle 100 to drive on the updated reference path.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100. In some embodiments, the trailer associated with the vehicle 100 can include similar sensors 202 for gathering similar data associated with the trailer, thereby further assisting with control operations of the autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, BLUETOOTH®, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a mass and center of gravity measurement module 242, a control module or controller 240, and an object detection and reference path generator module 246. The object detection and reference path generator module 246, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

The object detection and reference path generator module 246 may perform one or more tasks including, but not limited to, identifying one or more construction markers (or nodes), generating one or more connectivity graphs based upon identified construction markers (or nodes), updating a reference path based upon the one or more connectivity graphs, transmitting the updated reference path to other modules of the autonomy computing system 200 or mission control or both.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
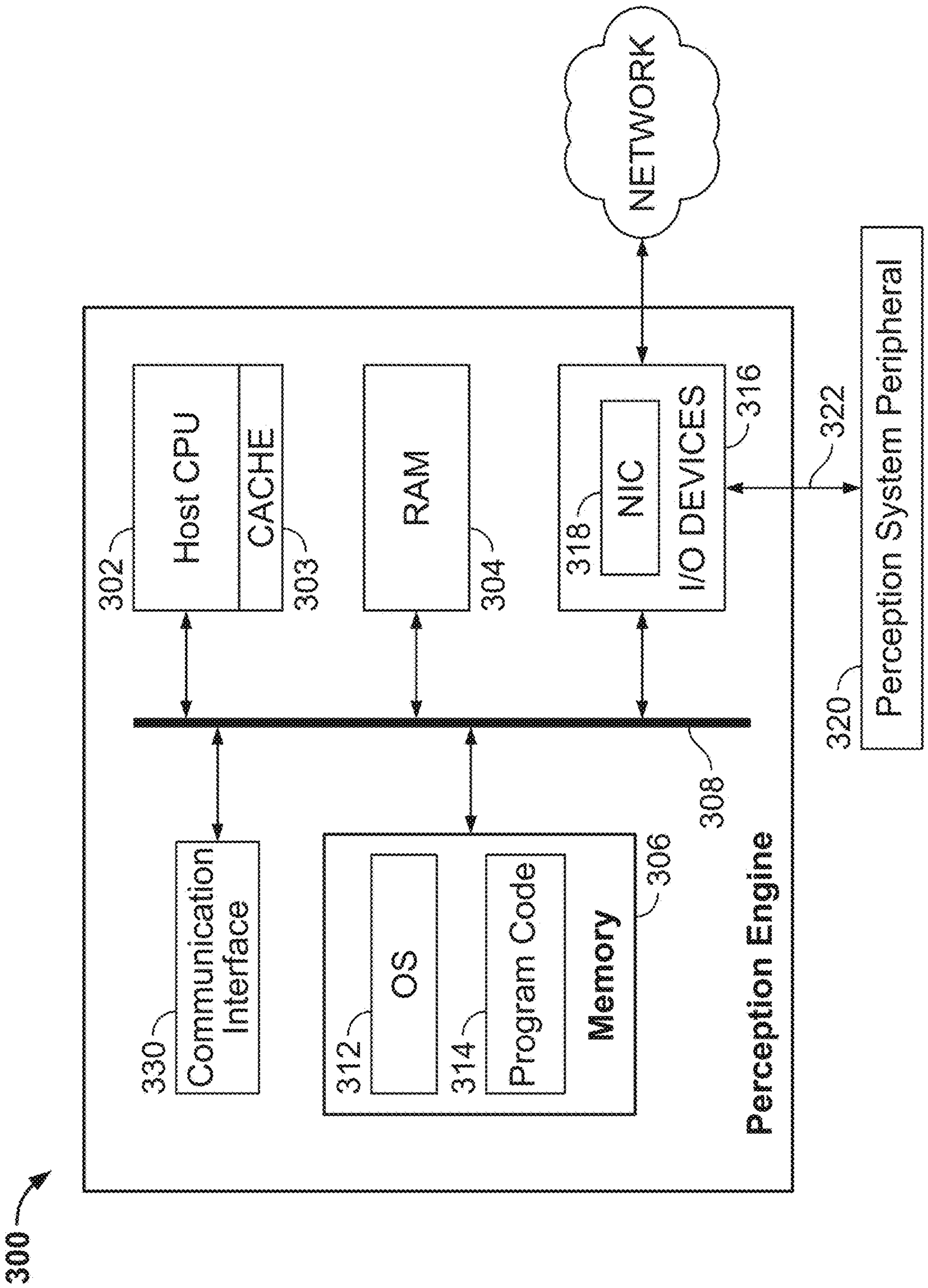
FIG. 3 is a block diagram of an example computing system.

FIG. 3 is a block diagram of an example computing system 300, such as the autonomy computing system 200 shown in FIG. 2, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 2. In alternative embodiments, one or more sections of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface 330 such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 4:
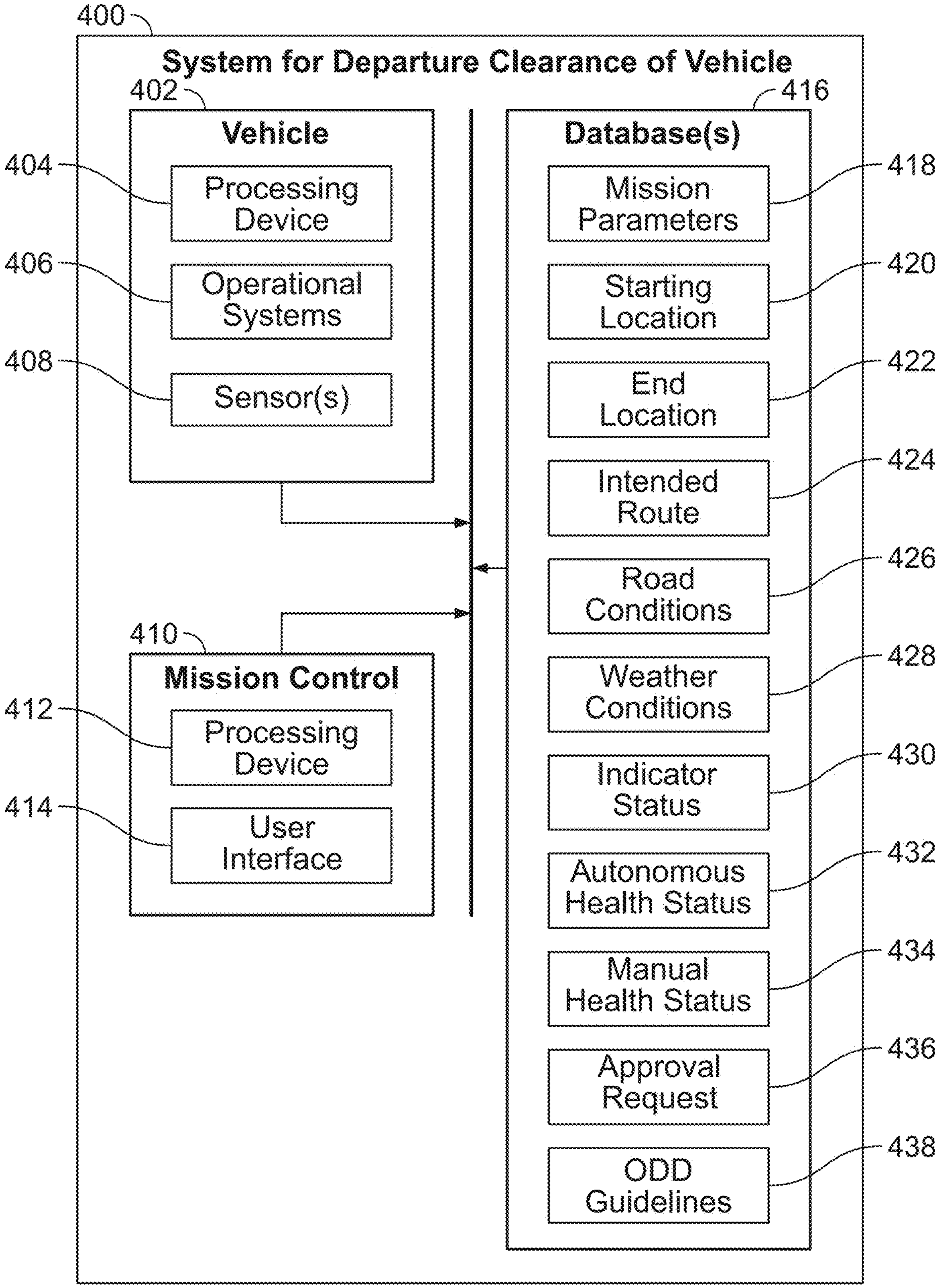
FIG. 4 is a block diagram of an exemplary system for departure clearance of a vehicle.

FIG. 4 is a block diagram of an exemplary system 400 for departure clearance of an autonomous vehicle 402. The vehicle 402 generally includes a processing device 404 (e.g., such as computing system 200 or computing system 300). The vehicle 402 includes various operational systems 406 (e.g., such as calibration 230, mapping 232, motion estimation 234, perception and understanding 236, behavior and planning 238, control 240, or the like). The vehicle 402 includes sensors 408 (e.g., sensors 202) to assist with the operational systems 406. The vehicle 402 includes a receiver and/or transmitter configured to allow for communication of data between the vehicle 402 and a central hub, such as mission control 410. Such communication can occur via, e.g., external interfaces 206, communication interface 330, or the like. The mission control 410 includes a processing device 412 and a user interface 414, e.g., a graphical user interface, that allows for input and display of data to be used by the system 400.

The system 400 includes one or more databases 416 configured to electronically store data for operating the departure clearance process of the system 400. The database 416 includes mission parameters 418 that can be transmitted to the vehicle 402 from mission control 410. The mission parameters 418 can include a variety of information, e.g., the starting location 420 of the vehicle 402, the final destination or end location 422 of the vehicle 402, and the intended route 424 to be taken from the starting location 420 to the end location 422. In some embodiments, the mission parameters 418 can include, e.g., a departure day, a departure time, an arrival day, an arrival time, a mission route, a mission identifier, a transaction identifier, or the like.

The system 400 receives information on road conditions 426 along the intended route 424. The road conditions 426 can include, e.g., road closures, traffic patterns, or the like. The system 400 receives information on weather conditions 428 along the intended route 424. In some embodiments, the road conditions 426 and/or the weather conditions 428 can be the current conditions. In some embodiments, the road conditions 426 and/or the weather conditions 428 can include predicted conditions based on previous patterns, historic data, and/or radar.

Based on the road and weather conditions 426, 428, the system 400 can determine whether the intended route 424 can be completed, i.e., if the mission parameters 418 can be completed. If the mission parameters 418 can be completed because the road conditions 426 and weather conditions 428 are clear or unproblematic, a "go" indicator status 430 can be transmitted to mission control 410 which, in turn, can indicate to the vehicle 402 that the vehicle can be deployed. If the mission parameters 418 cannot be completed because the road conditions 426 and/or the weather conditions 428 are not clear or are problematic, a "no go" indicator status 430 can be transmitted to mission control 410 which, in turn, can indicate to the vehicle 402 that deployment cannot occur. In some embodiments, if a "no go" indicator status 430 is generated, the system 400 can determine if alternate routes are available to still meet the mission parameters 418 by following a route that is not the intended route 424. If an acceptable alternate route is available, the system can set the new route as new mission parameters 418. Otherwise, the system 400 can hold the mission until the mission parameters 418 can be met.

The system 400 can review whether Operational Design Domain ODD guidelines 438 are met as part of the pre-deployment check for the vehicle 402. The ODD guidelines 438 can be standards unique to the vehicle 402 depending on the vehicle type, including limitations or conditions under which the autonomous vehicle 402 can operate. These ODD guidelines 438 can evolve over time as the functionality of the vehicle 402 is updated. As such, the system 400 can incorporate a review of the ODD guidelines 438 to ensure the vehicle 402 is permitted to proceed on the mission under current and expected conditions, e.g., environmental conditions, traffic patterns, road conditions, route availability, combinations thereof, or the like. For example, with respect to route availability, the autonomous vehicle 402 may only be authorized to operate on certain routes. If no authorized routes are available, e.g., due to a road closure, or the like, departure clearance for the vehicle 402 is not permitted by the system 400.

As part of the pre-deployment check, various operational systems 406 of the vehicle 402 are checked. Some systems 406 are checked manually, while some systems 406 are checked autonomously without manual human intervention. Some systems 406 are checked both manually and autonomously. The database 416 receives as input from the vehicle 402 the autonomous health status 432 of such systems 406, and also receives as input from the user interface 414 of mission control 410 of the manual health status 434. The manual and/or autonomous health status can check, e.g., visibility around the vehicle 402, fuel tank level, tire pressure level, trailer connection sensor, sensor 408 operation, obstacles around vehicle 402, or the like. The autonomous health status can involve checking systems that are not easily tested manually, but can include overlap in testing of systems or components of the vehicle 402 that are also tested through the manual health status check. The manual health status check can involve checking of one or more systems or components of the vehicle 402 by a human/user, rather than an automated check by the vehicle 402 itself. As non-limiting examples, manual health status checks can include, e.g., the exterior trailer state, the brake system state, the exterior body panel state, or the like, and autonomous health status checks can include, e.g., the calibration state, the localization state, the fluids state (fuel, diesel exhaust fluid, or the like), the connectivity state, or the like. In some embodiments, if a conflict occurs between the autonomous and manual health status 432, 434 based on an unhealthy status identified by the autonomous check, the autonomously performed health status 432 results govern the decision-making by the processing device 412 of mission control 410 in terms of whether to deploy the vehicle 402 or not. In some embodiments, as a safety, any unhealthy status—whether determined through the manual or autonomous review—overrides departure clearance and necessitates correction before departure clearance can be considered. Therefore, until such conflict is resolved, the vehicle 402 is not permitted to depart.

If there is no conflict between the autonomous and manual health status 432, 434, an approval request 436 from a mission manager can be requested via the user interface 414 of mission control 410. The mission manager can transfer the approval request 436 to a hub operator who is in the line of sight of the vehicle 402 (whether in person or remotely). The hub operator provides the final approval request 436 to the system 400, which enables departure of the vehicle 402 from the departure pad. The system 400 therefore provides various pre-deployment checks that ensure mission parameters 418 can be met before deploying the vehicle 402. If mission parameters 418 cannot be met based on, e.g., current and/or projected road and/or weather conditions 426, 428, the system 400 determines if alternate mission parameters 418 may be achieved or holds the mission until the mission parameters 418 can be met. This allows for an efficient deployment process for the vehicle 402 and avoids preventable delays during the mission.

Figure 5:
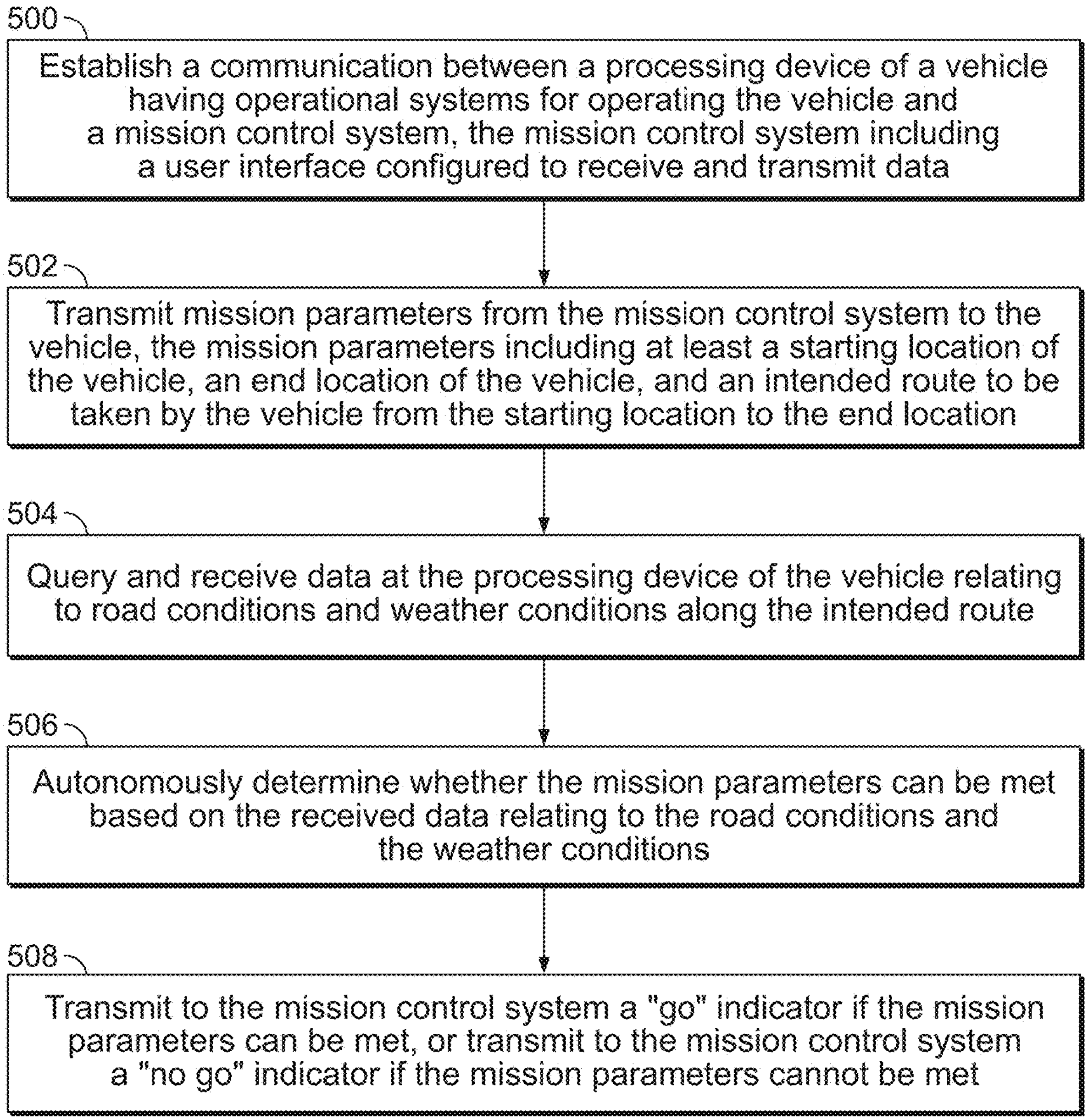
FIG. 5 is a flowchart of a method for departure clearance of a vehicle.

FIG. 5 is a flowchart of a method for departure clearance of a vehicle, as performed by the system 400. At 500, the method includes establishing a communication between a processing device of a vehicle having operational systems for operating the vehicle and a mission control system. The mission control system includes a user interface configured to receive and transmit data. At 502, the method includes transmitting mission parameters from the mission control system to the vehicle. The mission parameters include at least a starting location of the vehicle, an end location of the vehicle, and an intended route to be taken by the vehicle from the starting location to the end location.

At 504, the method includes querying and receiving data at the processing device of the vehicle relating to road conditions and weather conditions along the intended route. At 506, the method includes autonomously determining whether the mission parameters can be met based on the received data relating to the road conditions and the weather conditions. At 508, the method includes transmitting to the mission control system a "go" indicator if the mission parameters can be met, or transmitting to the mission control system a "no go" indicator if the mission parameters cannot be met.

The system discussed herein provides a service through which self-driving vehicles can be prepared and safely launched by one or multiple individuals from a logistics terminal onto the road. The system includes user facing and automated functionality to allow for proper deployment clearance of the vehicle. The system considers various mission parameters, including environmental conditions (e.g., weather and traffic), to determine if the mission parameters can be met, thereby meeting industry and internal safety standards.

In some embodiments, the system can include a virtual driver manager as one user. The virtual driver manager can validate the safe departure state, increase situational awareness for upcoming mission by aggregating beyond line-of-sight information (such as future weather and projected road conditions), validates business-specific parameters have been met prior to mission execution (e.g., bill of lading, hazmat documentation, or the like), and increases the likelihood of successfully completing the mission. In some embodiments, the system can include an autonomous terminal manager as one user. The autonomous terminal manager can provide time efficient documentation solutions for the pre-trip, performs automated archiving and storage, determines real-time availability of information to all relevant stakeholders, and provides integration of SDT information into existing terminal operation structure. In some embodiments, the system can include a virtual driver as a user that provides means to begin the mission.

In some embodiments, the vehicle or virtual driver can include three different stages of operation/programming—manual in which the vehicle can be moved by a human driver driving the vehicle, robotic-pause in which the vehicle is capable of driving in a robotic/autonomous state but is not allowed to do so, and robotic-run in which the vehicle is autonomously driving. Throughout the departure clearance process, the autonomous stack (e.g., virtual driver) can change from manual to robotic-run mode. Certain checks are completed before moving onto the next state.

For example, a pre-check area of the terminal can involve a human on site to perform physical checks of the vehicle while in manual mode. At the departure pad, a human can be used on site to push the button in the cabin of the vehicle to boot up the autonomy stack while the vehicle is in robotic-pause mode and ready for robotic operation. At the departure pad, the human can leave the vehicle and hands over remote operation to the vehicle with the vehicle ready for robotic operation. At the departure pad, the human can be remote and performs automated checks with the vehicle ready for robotic operation. At the departure pad, the human can be remote and, once all checks are performed successfully, the human gives departure clearance for the vehicle such that it operates in robotic-run mode. Upon departure clearance, the vehicle leaves the terminal/departure pad.

In some embodiments, the pre-trip check can be performed by a safety driver who executes the DOT-mandated pre-trip check on a table (e.g., a user interface) and submits results through mission control. In some embodiments, the pre-trip check can be performed by a safety conductor who executes the pre-trip check on a laptop (e.g., user interface) and submits results through mission control. In some embodiments, the departure clearance can be performed by a logistics specialist who reviews all pre-trip documentation submitted by the safety driver and safety conductor, and authorizes departure. In some embodiments, the departure clearance can involve an automated pre-trip check for the vehicle and results are submitted automatically through mission control. In some embodiments, a destination assignment can be communicated to the vehicle from mission control. In some embodiments, the vehicle can be released remotely by mission control without intervention from in-cab operators. In some embodiments, mission control can continue communication with the vehicle during the mission and systematically exchanges information to update both the vehicle and other data associated with the system.

Figure 6:
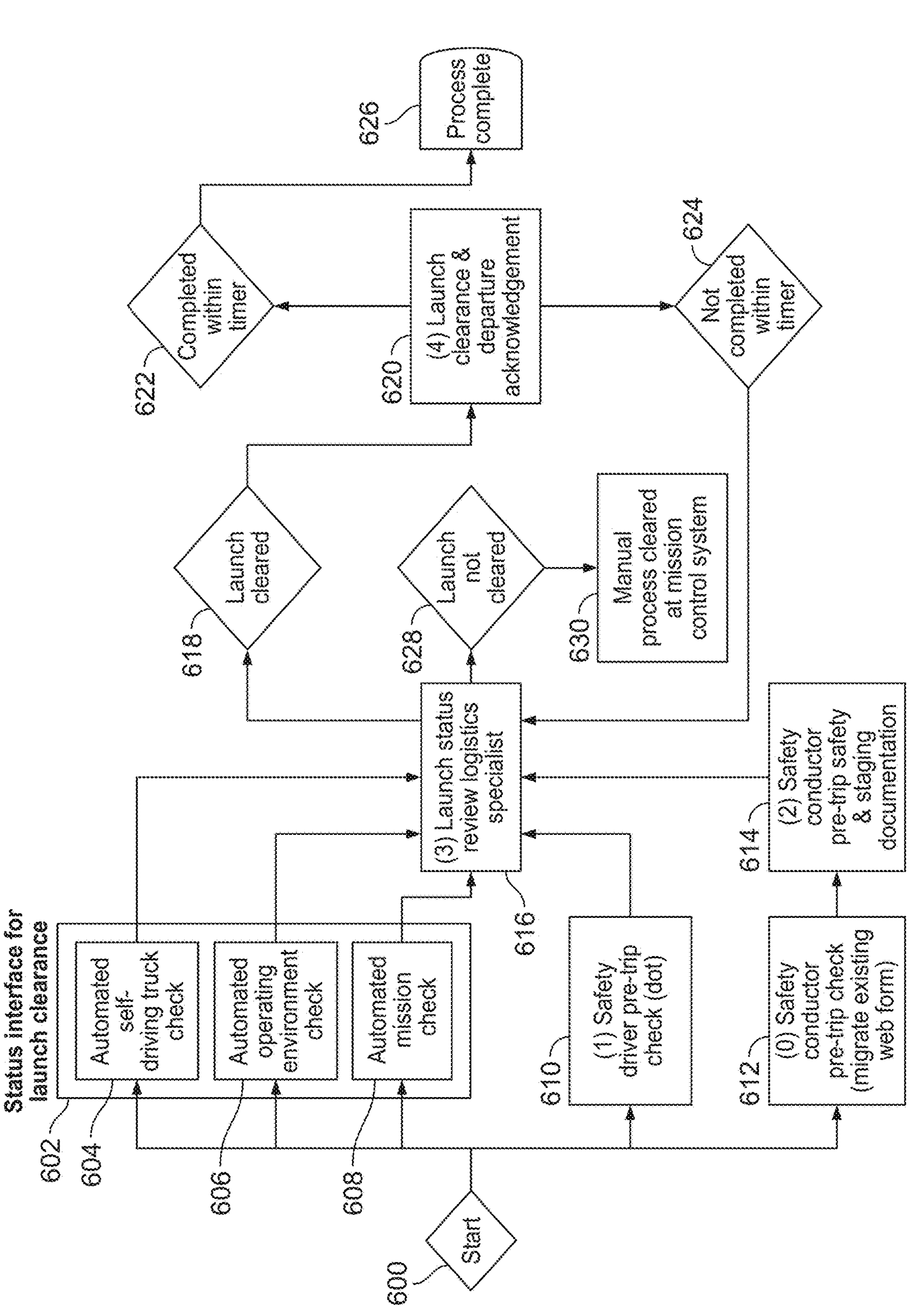
FIG. 6 is a flowchart of a mission control departure clearance process flow using an exemplary system for departure clearance of a vehicle.

FIG. 6 is a flowchart of a mission control departure clearance process flow using an exemplary system for departure clearance of a vehicle. The process starts at 600. The system includes a status interface 602 (e.g., user interface) for launch clearance. At the status interface 602, the steps of automated self-driving truck check 604, automated operating environment check 606, and automated mission check 608 are performed. At 610, input from the safety driver regarding the pre-trip check, e.g., including DOT standard checks, is received by the system. At 612, the pre-trip check results are input into the system by the safety conductor, which leads to pre-trip safety and staging documentation input into the system safety conductor (see 614). In some embodiments, the steps at interface 602 and 610, 612 can be performed substantially simultaneously.

At 616, the input data is received and reviewed by a logistics specialist to determine the launch status. If the logistics specialist determines that launch is cleared (see 618), a launch clearance and departure acknowledgement is input into the system (see 620). In some embodiments, a timer or time limit can be used for completing the launch. In such instances, a determination can be made whether the launch was completed within the timer/time limit (see 622) or not completed within the timer/time limit (see 624). If the launch was completed in a timely manner, the process is complete (see 626). If the launch was not completed in a timely manner, the process can return to 616. If the launch is not cleared by the logistics specialist (see 628), a manual process can be performed at the mission control system to address outstanding issues to permit launch to occur (see 630).

In terms of the safety driver input, the system allows for convenient input of pre-trip check data in an analyzable way, and digitizes the data, making it comparable against other data points and displayable to other operations users via user interfaces in a seamless manner. The assumptions of the system can be that all calibration and maintenance activities have been performed before launch sequence is started, the logistics specialist is the remote user, and the safety conductor or driver is the onsite user. The data collected from the safety driver can be grouped into red (do not launch), yellow (launch with caution) and green (acceptable for launch) classifications of major pre-trip check components, for example. A completed pre-trip check by the safety conductor will result in an action alert being transmitted to the next user in the launch process. The start of the pre-trip check serves as a trigger for other automated checks.

Still with reference to the safety driver interaction with the system, a variety of components and/or input can be provided. The system can include a mobile enabled user interface (e.g., a handheld mobile device) such that data can be input in any location and under all weather conditions. This allows for efficiency in collecting data regarding the pre-check status performed by the safety driver. The user interface allows the user to flag certain items that require follow-up action and delegate such action (e.g., yellow or red flags). Alerts can be triggered based on input of data into the system, providing clear visual indicators to the user if action is needed. The user can fail/decline certain actions via the user interface. The data input by the safety driver is communicated to the system, including mission control and the autonomous vehicle, to determine next steps for departure clearance.

In terms of the functional requirements of the system involving the safety driver, the following items can be included. The completed pre-trip check results in a request for providing launch clearance to a logistics specialist and is a prerequisite for launch. If there is a critical system or critical failure (e.g., a red indicator), the departure process can be stopped. A launch cannot be cleared for safety reasons when a critical failure is active. A failed, e.g., red, check results in an action or alert, and the user interface receives the alert to ensure action is taken to resolve the failure.

The safety conductor can have similar abilities within the system as the safety driver. The system allows the safety conductor to easily enter pre-trip details and confirm completion of safety and staging discussions. Same assumptions are made as the safety driver, and the system similarly includes a user interface that allows the safety conductor to enter data accurately and efficiently, with alerts or red/yellow flags used to mark data that requires follow-up. The system allow the completed pre-trip check to be cleared to allow for launch clearance by the logistics specialist. If there is a red/failed check, launch cannot be cleared and the issue must be addressed.

The logistics specialist can have similar access to the system and reviews the previously entered information regarding the pre-check results. Again, launch clearance cannot occur if there are outstanding red or failed checks. The safety conductor can have similar access to the system and reviews the previously entered information regarding the pre-check results and the launch clearance by the logistics specialist. After the safety conductor confirms departure details and enters their information into the system, a request can be transmitted to the logistics specialist for final sign off on launch of the vehicle. The system therefore takes into account both manual and autonomous health checks and mission parameter checks, and includes multiple steps of approval before launch can occur, ensuring that all conflicts are resolved before launch approval.

Figure 7:
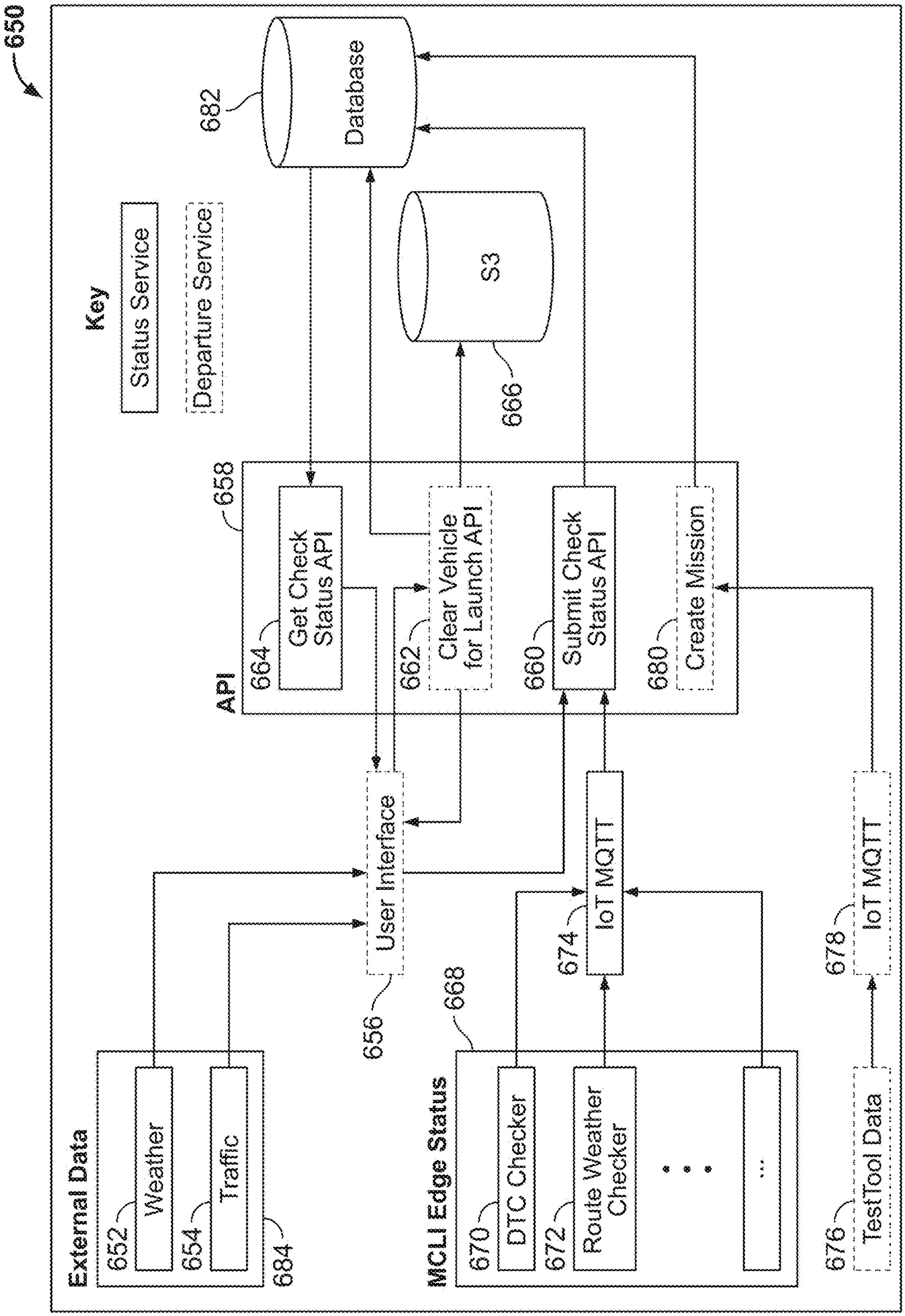
FIG. 7 is a block diagram of an exemplary system for departure clearance of a vehicle.

FIG. 7 is a block diagram of an exemplary system 650 for departure clearance of a vehicle. The system 650 includes various status and departure services. The system of FIG. 7 uses a test identification (ID) from the on-board test tool of the vehicle and displays the departure clearance in a user interface, rather than transmitting it to a virtual driver. The system 650 receives external data 684, such as weather 652 and traffic 654, at a user interface 656. The user interface 656 can be in communication with mission control 658 to submit the check status results 660 and to clear the vehicle for launch 662. A query 664 for check status can be transmitted from mission control 658 to the user interface 656. Clearance for vehicle launch 662 can be transmitted to the autonomous vehicle 666 to allow for departure.

The system 650 includes an autonomous checker 668 for mission parameters, which performs a health check 670 of the vehicle 666, route and weather checks 672, or the like. This information can be transmitted through an internet-of-things (IoT) 674 the check status results 660 to be considered in combination with other check status results in determining whether launch of the vehicle 666 is permitted. The system 650 can include test tool data 676 that communicates through an internet-of-things (IoT) 678 to generate a mission 680 for the vehicle 666. All data collected by the system can be stored in one or more databases 682.

Figure 8:
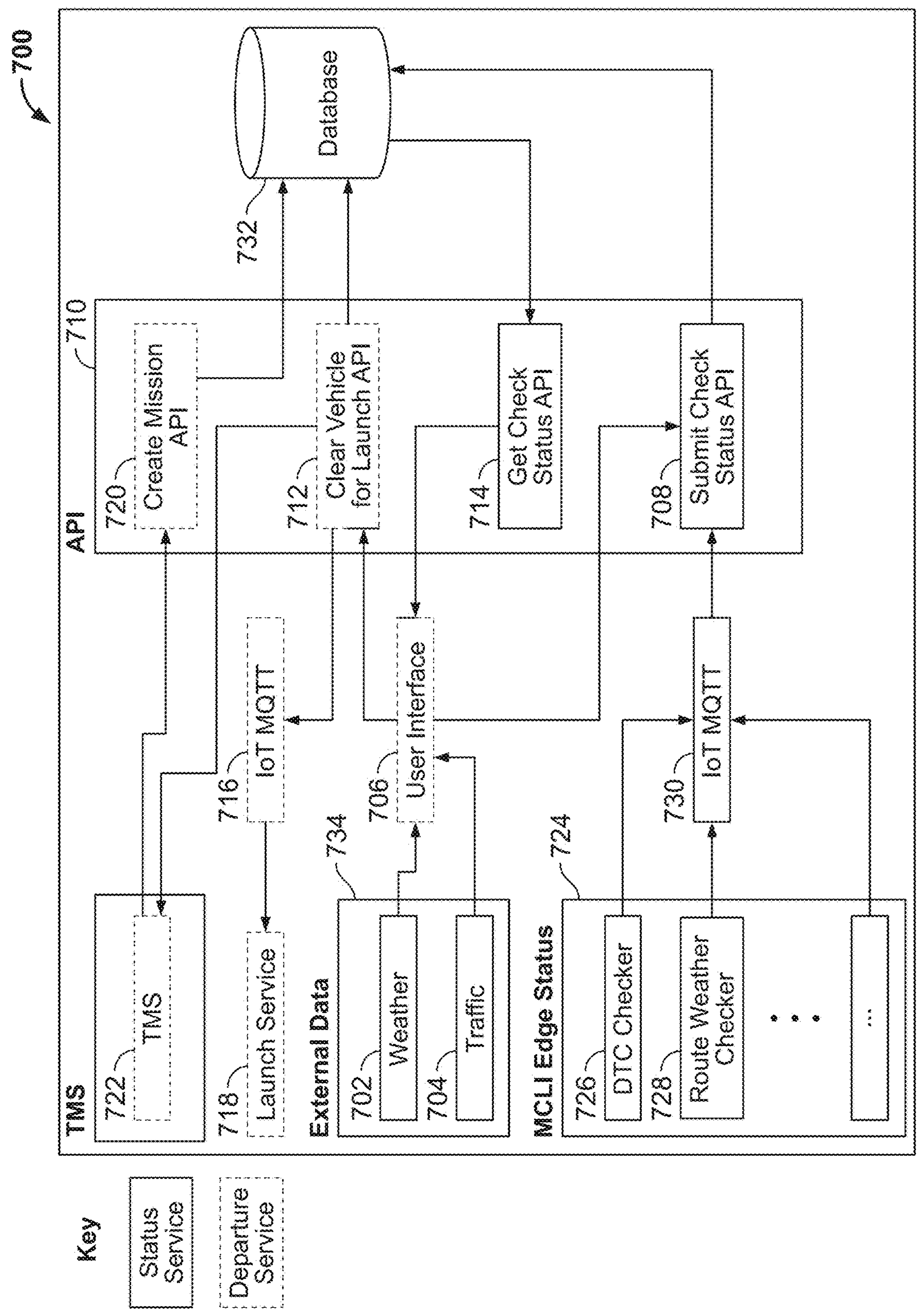
FIG. 8 is a block diagram of an exemplary system for departure clearance of a vehicle.

FIG. 8 is a block diagram of an exemplary system 700 for departure clearance of a vehicle. The system 700 includes various status and departure services. The system 700 creates a mission based on a trigger from the Transportation Management System (TMS) and transmits a launch command to a virtual driver via the Edge, i.e., the autonomous status checker. The system 700 receives external data 734 in the form of weather 702 and traffic 704 information. This information is transmitted to a user interface 706 which is used to submit check status 708 to mission control 710, transmits clearance for vehicle launch 712, and receives queries regarding the check status 714. The vehicle launch 712 can transmit via an internet-of-things (IoT) 716 a launch service 718 permission to launch the autonomous vehicle. A mission 720 is created based on data and/or parameters from the TMS 722 and transmitted to mission control 710, which also receives the vehicle launch 712. The system 700 includes an autonomous checker 724 that checks the health status 726 and route/weather checks 728. The autonomous results are transmitted via an internet-of-things (IoT) 730 to the check status 708 of mission control 710. Data collected by the system 700 can be stored in one or more databases 732.

FIG. 9 is a flow chart of mission parameter checks performed by an exemplary system for departure clearance of a vehicle. The process includes a status root 750 (e.g., mission control) that regulates performing of the status checks and allows for collection of data associated with the checks. The status root 750 can communicate with the virtual driver 752 (e.g., the processor of the autonomous vehicle) to perform health checks by executing/running software associated with a DTC checker 754, and a perform weather checks by executing/running software associated with a weather checker 756. The status root 750 can communicate with the physical vehicle 758 to perform various operational checks, such as a tail light check 760.

FIG. 10 is an example of source code for the mission parameter checks of FIG. 9. The source code can indicate "true" for parameters that have been met and "false" for parameters that are not met. The status of the checks can be displayed to the user as a hierarchy with sub-systems of sub-systems. This allows the user to categorize issues and understand what needs to be resolved to meet mission parameters. In some embodiments, the checks data can be stored in a flattened state (such as the table of FIG. 11), thereby simplifying the implementation.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term “non-transitory computer-readable media” is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., “software” and “firmware,” in a non-transitory computer-readable medium. As used herein, the terms “software” and “firmware” are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word “a” or “an” should be understood as not excluding plural elements or steps unless such exclusion is explicitly recited. Furthermore, references to “one embodiment” of the disclosure or an “exemplary” or “example” embodiment are not intended to be interpreted as excluding the existence of additional embodiments that also incorporate the recited features. Likewise, limitations associated with “one embodiment” or “an embodiment” should not be interpreted as limiting to all embodiments unless explicitly recited.

Disjunctive language such as the phrase “at least one of X, Y, or Z,” unless specifically stated otherwise, is generally intended, within the context presented, to disclose that an item, term, etc. may be either X, Y, or Z, or any combination thereof (e.g., X, Y, and/or Z). Likewise, conjunctive language such as the phrase “at least one of X, Y, and Z,” unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for departure clearance of a vehicle, comprising:

a processing device and operational systems for operating the vehicle; and a mission control system in communication with the processing device of the vehicle, the mission control system including a user interface configured to receive and transmit data;

wherein the processing device of the vehicle and/or a processing device of the mission control system are configured to execute instructions stored in a memory to perform operations comprising:

transmitting mission parameters from the mission control system to the vehicle, the mission parameters including at least a starting location of the vehicle, an end location of the vehicle, and an intended route to be taken by the vehicle from the starting location to the end location;

querying and receiving data at the processing device of the vehicle relating to road conditions and weather conditions along the intended route;

performing, by the processing device and without human intervention, an autonomous vehicle health assessment comprising evaluating a sensor state of at least one sensor of the vehicle, the sensor state being one of a calibration state or a localization state, and evaluating an operational status of one or more autonomous driving systems of the vehicle;

determining whether the intended route satisfies operation design domain (ODD) requirements of the vehicle based on the road conditions and the weather conditions;

determining, without human intervention, whether the mission parameters can be met based on the received data relating to the road conditions and the weather conditions, wherein the mission parameters can be met if the intended route is capable of being completed based on the received data relating to the road conditions and the weather conditions;

transmitting to the mission control system a “go” indicator if the mission parameters can be met, the “go” indicator providing a departure clearance signal to the vehicle; and controlling the vehicle in autonomous operation mode to depart the starting location on the intended route based on receipt of the departure clearance signal.

2. The system of claim 1, wherein the operational systems include at least one of sensors for providing visibility around the vehicle, a fuel tank sensor, tire pressure sensors, or a trailer connection sensor.

3. The system of claim 1, wherein the mission parameters include at least one of a departure day, a departure time, an arrival day, an arrival time, a mission route, a mission identifier, a transaction identifier, the weather conditions, or the road conditions.

4. The system of claim 1, wherein the operations further comprise checking, without human intervention, a health status of the operational systems with the processing device of the vehicle, and transmitting results of the health status to the mission control system.

5. The system of claim 4, wherein the operations further comprise receiving as input via the user interface at the mission control system a health status confirmation for at least some of the operational systems based on a manual check of the at least some of the operational systems.

6. The system of claim 5, wherein if a conflict occurs between results of the health status performed without human intervention and the health status confirmation performed by the manual check based on an unhealthy status identified by the health status performed without human intervention and a health status identified by the manual check, the health status performed without human intervention governs decision making by the processing device and the mission control system.

7. The system of claim 1, wherein if the mission parameters cannot be met, the operations comprise transmitting a "no go" indicator to the mission control system, and the operations further comprise generating new mission parameters that adjust the mission parameters based on the data relating to the road conditions and the weather conditions.

8. The system of claim 5, wherein if the "go" indicator is transmitted to the mission control system, the health status of the operational systems checked without human intervention by the processing device of the vehicle is confirmed, and the health status confirmation based on the manual check is confirmed, the operations further comprise transmitting an approval request from a mission manager via the user interface of the mission control system.

9. The system of claim 8, wherein the operations further comprise receiving the approval request from the mission manager via the user interface, and transmitting a final departure approval request from a hub operator for launch of the vehicle from a departure pad, and wherein the operations further comprise receiving the final departure approval request from the hub operator via the user interface of the mission control system.

10. The system of claim 1, wherein the operations further comprise determining, without human intervention, whether the mission parameters can be met based on operational design domain (ODD) guidelines, and wherein the ODD guidelines include limitations on environmental conditions in which autonomous operation of the vehicle can be performed.

11. The system of claim 1, wherein the intended route is capable of being completed based on the received data relating to the road conditions if there is no road closure along the intended route.

12. The system of claim 1, wherein the intended route is capable of being completed based on the received data relating to the weather conditions if the weather conditions are safe for travel of the vehicle along the intended route.

13. The system of claim 1, wherein the road conditions and the weather conditions include current road conditions and current weather conditions, and predicted road conditions and predicted weather conditions.

14. A computer-implemented method for departure clearance of a vehicle, comprising:

establishing a communication between a processing device of a vehicle having operational systems for operating the vehicle and a mission control system, the mission control system including a user interface configured to receive and transmit data;

transmitting mission parameters from the mission control system to the vehicle, the mission parameters including at least a starting location of the vehicle, an end location of the vehicle, and an intended route to be taken by the vehicle from the starting location to the end location;

querying and receiving data at the processing device of the vehicle relating to road conditions and weather conditions along the intended route;

performing, by the processing device and without human intervention, an autonomous vehicle health assessment comprising evaluating a sensor state of at least one sensor of the vehicle, the sensor state being one of a calibration state or a localization state, and evaluating an operational status of one or more autonomous driving systems of the vehicle;

determining whether the intended route satisfies operation design domain (ODD) requirements of the vehicle based on the road conditions and the weather conditions;

determining, without human intervention, whether the mission parameters can be met based on the received data relating to the road conditions and the weather conditions, wherein the mission parameters can be met if the intended route is capable of being completed based on the received data relating to the road conditions and the weather conditions;

transmitting to the mission control system a "go" indicator if the mission parameters can be met, the "go" indicator providing a departure clearance signal to the vehicle; and controlling the vehicle in autonomous operation mode to depart the starting location on the intended route based on receipt of the departure clearance signal.

15. The method of claim 14, comprising checking, without human intervention, a health status of the operational systems with the processing device of the vehicle, and transmitting results of the health status to the mission control system.

16. The method of claim 15, wherein comprising receiving as input via the user interface at the mission control system a health status confirmation for at least some of the operational systems based on a manual check of the at least some of the operational systems.

17. The method of claim 16, wherein if a conflict occurs between results of the health status performed without human intervention and the health status confirmation performed by the manual check based on an unhealthy status identified by the health status performed without human intervention and a health status identified by the manual check, the health status performed without human intervention governs decision making by the processing device and the mission control system.

18. The method of claim 16, wherein if the "go" indicator is transmitted to the mission control system, the health status of the operational systems checked without human intervention by the processing device of the vehicle is confirmed, and the health status confirmation based on the manual check is confirmed, the method comprises transmitting an approval request from a mission manager via the user interface of the mission control system.

19. The method of claim 18, comprising receiving the approval request from the mission manager via the user interface, and transmitting a final departure approval request from a hub operator for launch of the vehicle from a departure pad, and comprising receiving the final departure approval request from the hub operator via the user interface of the mission control system.

20. The method of claim 14, wherein if the mission parameters cannot be met, the operations comprise transmitting a "no go" indicator to the mission control system, and the method comprises generating new mission parameters that adjust the mission parameters based on the data relating to the road conditions and the weather conditions.

* * * * *